Figure 1:
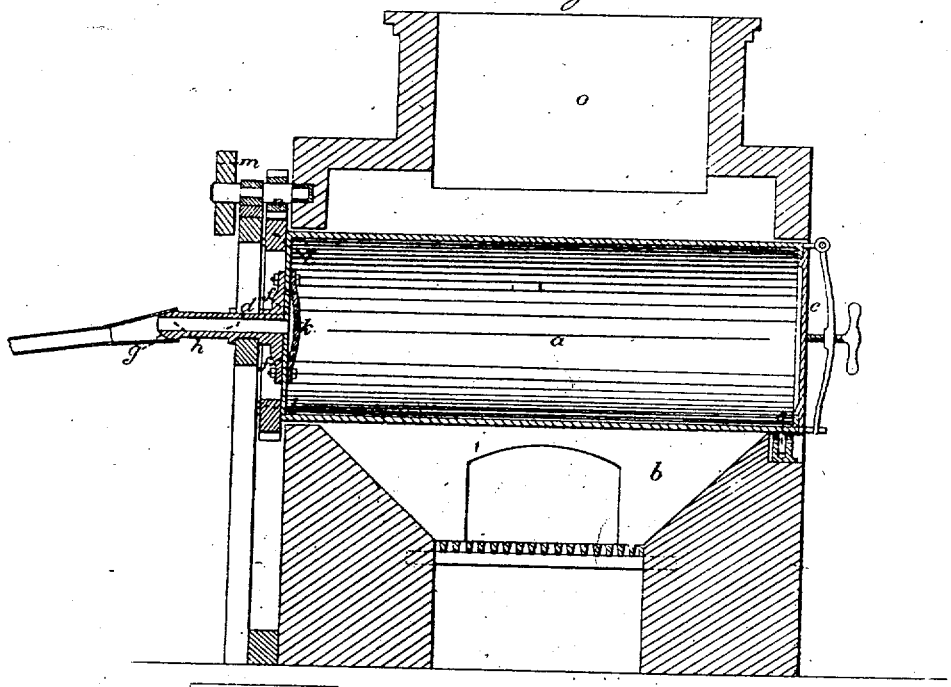

ALTER & HILL.

Oil Still.

No. 663.

Reissued Feb. 8. 1859.

Inventor.

David Alter

Samuel A. Hill

UNITED STATES PATENT OFFICE.

D. ALTER AND S. A. HILL, OF FREEPORT, PENNSYLVANIA, ASSIGNORS TO THEMSELVES AND W. F. JOHNSTON, G. S. SELDEN, JOHN L. RUSSELL AND JOHN T. JOHNSTON.

IMPROVEMENT IN DISTILLATION OF OILS FROM COAL.

Specification forming part of Letters Patent No. 20,825, dated April 27, 1858; Reissue No. 663, dated February 8, 1859.

*To all whom it may concern:*

Be it known that we, DAVID ALTER and SAMUEL A. HILL, of Freeport, in the county of Armstrong and State of Pennsylvania, have invented a new and useful Improvement in the Manufacture of Oil from Coal and other Bituminous Substances by Destructive Distillation; and we do hereby declare that the following is a full, clear, and exact description thereof, reference being had to the annexed drawings, forming part of this specification.

The great difficulty experienced in the manufacture of oil from coal and other bituminous substances arises from the extreme liability to the generation of permanent gas instead of the extraction of oleaginous vapor susceptible of condensation into oil, and this result is not only attended with danger to works not constructed for the manufacture of inflammable gas, but is a serious loss by the production of an article foreign to the object of the process, and by a proportionate diminution in the quantity of oil obtained from a given quantity of coal or other substance under treatment. To overcome this difficulty it has been found necessary to apply a low-degree of heat to the retorts containing the substance under treatment; and even this expedient has proved only partially successful, owing to the fact that the contents of a stationary retort are necessarily exposed to different degrees of heat, so that if these portions of the coal, &c., which are farthest from the fire be sufficiently heated to carry on the process of distillation, the remaining portions of the contents of the retort being nearer to the fire will give out a greater or less volume of permanent gas and vapor not readily condensible. Another objection, in practice, to the application of a low heat, is that the process of distillation is carried on so very slowly as to be a serious hinderance in the manufacture.

In the production of permanent gas for illuminating purposes a high degree of heat and a rapid generation of gas are very desirable, and for this purpose the use of retorts having a rotary motion and exposed to a very high degree of heat has been suggested; but whether applied to actual use in practice in this country or elsewhere we do not know. We have discovered, however, that by combining, in the manufacture of oil from coal and other bituminous substances, the use of retorts having a rotary or other equivalent motion, so as to agitate their contents and thus expose uniformly to the heat all the particles of the substance or substances under treatment with a low red heat—say about 850° Fahrenheit—we accomplish a result hitherto unattained, by a combination or process never previously attempted—that is to say, we are enabled to extract from the coal or other bituminous substances, by destructive distillation, a maximum quantity of condensable oleaginous vapor with a minimum proportion of permanent gas, and to accomplish this result far more rapidly than it can be done by any other process or combination heretofore practiced or known.

Our invention, then, consists not simply in the use of retorts having a rotary or other equivalent motion or otherwise so constructed as to agitate their contents during the process of distillation, nor yet in the employment, *per se*, of a low degree of heat in the extraction of oil, but in the combination of a retort so constructed, substantially as hereinafter described, with a low degree of heat in the process of destructive distillation of oil from coal or other bituminous substances, by means whereof a much larger proportion of condensable oleaginous vapor is produced in a much shorter space of time than by any other known method.

To enable others skilled in the art to construct and use our invention, we will proceed to describe the construction and mode of operation of our retorts, and in so doing we shall particularize the peculiar shape and [illegible] of retort and arrangement of apparatus which we deem preferable, not confining ourselves, however, to the exact shape, construction, and arrangement of parts described.

Figure 2:
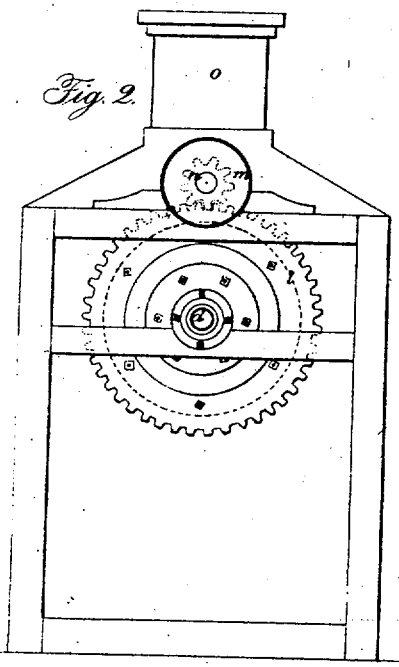
Figure 3:
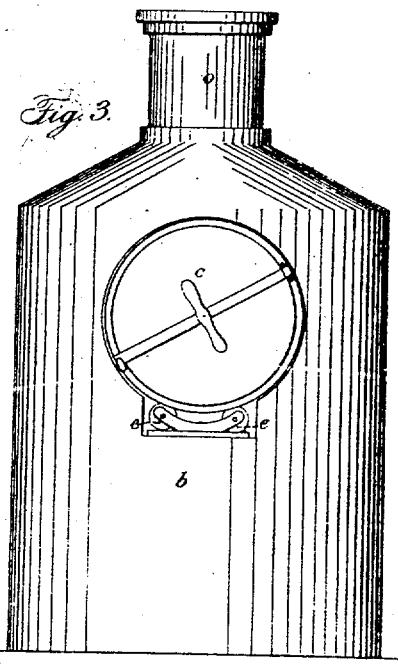

In the accompanying drawings, forming part of this specification, Figure 1 is a longitudinal sectional elevation of our retort and furnace through the center or axis of the retort. Fig. 2 is an elevation of the rear end of the retort and furnace, showing the arrangement for effecting the rotation of the retort on its axis. Fig. 3 is an elevation of the front end of the retort and furnace.

In the several figures like letters of reference denote similar parts of our apparatus.

In the drawings, *a* is a cylindrical metallic retort set in a furnace, *b*, so constructed as that the frame passes all round the retort, as seen in Fig. 1. The front end of the retort *a* is closed by a door, *c*, similar to those used for ordinary gas-retorts, which may be removed, when necessary, to insert a fresh charge or remove an exhausted one. The retort does not come in contact with the furnace itself at any point, a circular aperture being made in the front and back walls, through which the ends of the retort are inserted, so as to be flush with the outer face of the walls. The front end of the retort *a* is supported by two friction-rollers, *e e*, which turn on bearings resting on the front wall of the furnace, as seen in Figs. 1 and 3. The rear end of the retort is supported by a tube, *d*, attached to the retort by a flange, *f*, or other suitable device, the orifice of the tube *d* coinciding with an aperture of similar diameter in the center of the retort. This tube serves as a journal on which the retort turns and forms the only passage to the condensing-worm for the volatile products of the charge in the retort. The extremity *h* of the tube *d* is spherical and smooth, and being inserted into the conical mouth of the escape-pipe *g*, which conducts the products of distillation to the condensing-worm, forms with it a ball-and-socket joint, thus permitting the tube *d* to turn freely with the retort, while the conical mouth of the escape-pipe *g* inclining downward prevents any condensed vapor or oil returning into the retorts or obstructing the tube *d*. The orifice of the tube *d*, opening into the retort *a*, is covered but not closed by a convex perforated disk, *k*, through the perforations of which the oleaginous vapor passes into the tube *d*, and thence through the escape-pipe *g*, the disk *k* preventing the choking of the aperture in the retort (forming the orifice of the tube *d*) by the broken coal or other contents of the retort. This disk is fastened by rivets or bolts to the inner side of the rear end of the retort.

The rotation of the retort on its axis may be produced by communication of power from some prime motor in any convenient way, as by attaching a large cog-wheel, *l*, concentric to the rear end of the retort, gearing with the teeth of a pinion, *n*, on the shaft, which carries the pulley or drum *m* to which the power and motion are communicated.

The motion which we have described as communicated to our retorts is revolution on their axes, which accomplishes the requisite purposes of agitating the contents of the retort, exposing them to a uniform heat, keeping the retort itself at an even temperature, and expediting the process of distillation under a low heat better than any other method. Should it however be found more convenient to give to the retort, or other equivalent, motion, or to intermit the motion at short intervals, it may be done, while the objects of our invention are substantially accomplished.

We will now proceed to describe the mode of using our retorts, premising that it is desirable, in order to increase the rapidity of the process and the yield from a given quantity of coal, &c., under treatment, the coal should be ground to powder or broken up small before placing it in the retorts. The retorts being charged with a sufficient quantity of broken coal or other substance to make them about half-full, the door *c* is fastened up and a fire kindled in the furnace, the flame and heat passing all round the retorts in passing to the chimney *t*. The fire is so regulated as to keep up a low red heat—say about 850° Fahrenheit, or less, if permanent gas be too largely evolved—and the retorts are set in motion, revolving about once in every twenty seconds, and, should the heat increase, the rapidity of revolution of the retorts is accelerated, so as to prevent injury to the products of distillation and keep down the evolution of permanent gas. The motion of the retorts is continued during the whole time that the process of distillation is in progress, and causes a continual mixing up and agitation of the contents of the retort, and thus subjects every portion to an uniformly low degree of heat. By this means the heat is much more rapidly abstracted from the retort and communicated to its contents than is possible with the use of a stationary retort, and thereby, with a much lower degree of heat than would be necessary to accomplish the result with a stationary retort, the process of distillation is carried on and completed in much shorter period of time and without injury to the products of distillation, or the generation of any considerable quantity of permanent gas, which would necessarily result from the use of stationary retorts by reason of the unavoidable exposure of portions of the coal, &c., to a greater heat than the residue, and the undue heating of the lower or fire end of the retort.

So great is the advantage resulting from our combination of the rotating retort with the employment of a low degree of heat that, by our process, a charge of coal can be worked off and all its oleaginous vapor extracted without injury to the oil, or the generation of much permanent gas, in from one-half to one-fourth of the time necessarily consumed in exhausting a charge of a like quantity of coal in a stationary retort.

Whatever similarity there may appear to be in the mere apparatus employed, the process of extracting the gaseous products of coal and other bituminous substances varies, essentially, from that required to distill these substances or extract their liquid products, and it is to the accomplishment of this latter result and the avoidance of the former that our invention is designed to apply.

We do not claim originality or novelty in the use of cylindrical metallic retorts so constructed as to rotate on their axis during the process of destructive distillation, excepting in the combination hereinafter described, and for the purpose of "distilling" or extracting the fluid products, especially oil, from coal and other bituminous substances. Neither do we claim making the retort to shift on its axis after each successive process of distillation, so as to expose different parts of the retort to the action of the fire, and thus prevent its rapid oxidation, as seen in Gengembre's patent; nor yet do claim, *per se*, or otherwise than in the combination hereinafter stated, the use of a low degree of heat in the process of distilling oil from coal, &c.; but What we do claim as our invention, and desire to secure by Letters Patent, is—

The destructive distillation of coal or other bituminous substances for the obtaining the liquid products thereof in the form of what is known as "coal-oils" by the process hereinbefore described—viz., combining the use of a low temperature, not exceeding a low red heat, say about 850° Fahrenheit, with the use of retorts so constructed as to have a rotary or other equivalent motion for the purpose of agitating their contents—substantially in the manner and for the purposes hereinbefore set forth.

DAVID ALTER.
SAMUEL A. HILL.

Witnesses:
JACOB SHOOP,
J. W. BOLE.